United States Patent
Sagong et al.

(10) Patent No.: US 9,306,648 B2
(45) Date of Patent: Apr. 5, 2016

(54) METHOD AND DEVICE FOR PERFORMING BEAM TRACKING THROUGH SHORT RANGE OBJECT DETECTION

(71) Applicant: Samsung Electronics Co., Ltd., Suwon-si, Gyeonggi-do (KR)

(72) Inventors: Min Sagong, Suwon-si (KR); Chi-Woo Lim, Suwon-si (KR); Su-Ryong Jeong, Yongin-si (KR); Sung-Nam Hong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/589,410

(22) Filed: Jan. 5, 2015

(65) Prior Publication Data
US 2015/0195026 A1    Jul. 9, 2015

(30) Foreign Application Priority Data
Jan. 6, 2014  (KR) .................. 10-2014-0001271

(51) Int. Cl.
*H04L 1/02*   (2006.01)
*H04B 7/06*   (2006.01)
*H04B 17/27*  (2015.01)

(52) U.S. Cl.
CPC ............ *H04B 7/0617* (2013.01); *H04B 7/0695* (2013.01); *H04B 17/27* (2015.01)

(58) Field of Classification Search
CPC ........ H04L 1/0618; H04L 1/06; G01S 13/931
USPC ................ 375/267, 347, 349; 342/70, 81, 85; 455/214, 337
See application file for complete search history.

(56) References Cited

U.S. PATENT DOCUMENTS 6,694,154 B1    2/2004  Molnar et al.
2003/0164791 A1*  9/2003  Shinoda et al. ................. 342/70

FOREIGN PATENT DOCUMENTS

KR  10-2013-0029745 A  3/2013
WO  2013/039355 A2    3/2013

* cited by examiner

*Primary Examiner* — Khai Tran
(74) *Attorney, Agent, or Firm* — Jefferson IP Law, LLP (57) ABSTRACT

A method of a terminal that forms beams and a device for performing beam tracking in a communication system that supports beamforming are provided. The method includes detecting, by the terminal, an object located at a periphery of the terminal and performing beam tracking through beams formed by the terminal, except for a beam that is formed in a direction in which the detected object is located.

23 Claims, 10 Drawing Sheets

METHOD AND DEVICE FOR PERFORMING BEAM TRACKING THROUGH SHORT RANGE OBJECT DETECTION

CROSS-REFERENCE TO RELATED APPLICATION(S)

This application claims the benefit under 35 U.S.C. §119 (a) of a Korean patent application filed on Jan. 6, 2014 in the Korean Intellectual Property Office and assigned Serial number 10-2014-0001271, the entire disclosure of which is hereby incorporated by reference.

TECHNICAL FIELD

The present disclosure relates to a method and device for performing beam tracking in a communication system that supports beamforming.

BACKGROUND

In a cellular communication system that supports beamforming, a base station and a terminal may form a plurality of beams for signal transmission and reception. When performing communication using beamforming, the base station and the terminal do not simultaneously form an entire beam but form only one beam or a partial beam at one time. Particularly, each of the base station and the terminal may select an optimal beam of a plurality of beams according to a beamforming protocol and transmit and receive a signal using the selected beam.

In general, a terminal may select an optimal beam through beam tracking and communicate with a base station. For example, in order to perform communication with the base station, the terminal may select an optimal beam of a plurality of transmitting and receiving beams having different directionality and perform communication with the base station through a corresponding beam.

However, in order to select an optimal beam for performing communication with the base station among a plurality of transmitting and receiving beams having different directionality, the terminal should continuously perform beam tracking in the background. In more detail, in order to select an optimal beam, the terminal should continuously perform beam tracking using an entire beam of a plurality of transmitting and receiving beams having different directionality. That is, because the terminal should continuously perform beam tracking using an entire transmitting and receiving beam, a problem that power consumption according to beam tracking increases may occur. Accordingly, when a terminal performs beam tracking, a method of reducing power consumption is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for detecting a short range obstacle and determining a transmitting and receiving beam direction in a terminal that supports a beamforming system.

Another aspect of the present disclosure is to provide a method and device for performing beam tracking using a transmitting and receiving beam corresponding to other directions, except for a direction in which an obstacle is detected in a terminal that supports a beamforming system.

Another aspect of the present disclosure is to provide a method and device for correlating and managing a sensor that detects an obstacle and a plurality of transmitting and receiving beams having directionality in a terminal that supports a beamforming system.

In accordance with an aspect of the present disclosure, a method of a terminal that forms beams is provided. The method includes detecting, by the terminal, an obstacle located at a periphery of the terminal and performing beam tracking through beams formed by the terminal, except for a beam that is formed in a direction in which the detected obstacle is located.

In accordance with another aspect of the present disclosure, a device of a terminal is provided. The device includes a controller including a processor and an obstacle detection unit configured to detect an obstacle located at a periphery of the terminal and a beam forming unit configured to perform beam tracking through beams formed by the terminal, except for a beam that is formed in a direction in which the detected obstacle is located.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a method and device for searching for a cell of a terminal in a communication system that supports beamforming will be described.

FIGS. 1 through 9, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
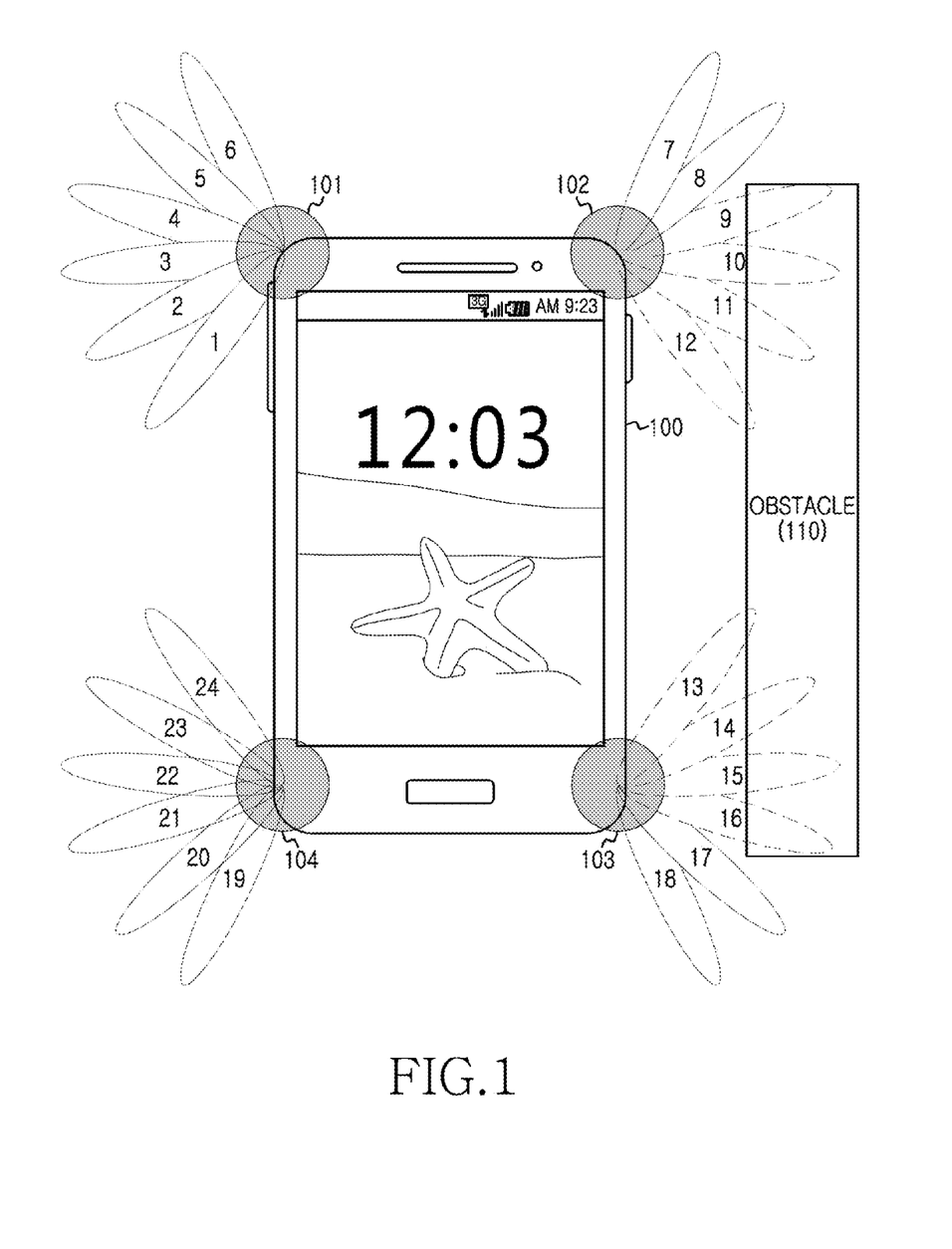
FIG. 1 is a diagram illustrating an example in which a terminal performs beam tracking through a transmitting and receiving beam of a direction, except for a direction in which an obstacle is located according to an embodiment of the present disclosure.

FIG. 1 is a diagram illustrating an example in which a terminal performs beam tracking through a transmitting and receiving beam of a direction, except for a direction in which an obstacle is located according to an embodiment of the present disclosure. In the following description, a transmitting and receiving beam may be a beam formed to have specific directionality through an antenna to be used for transmitting and/or receiving a signal.

Referring to FIG. 1, a terminal 100 is illustrated, where the terminal 100 may include four antennas 101, 102, 103 and 104 at four corners thereof, and where each of the antennas 101 to 104 may form a plurality of beams having different directionality. Further, FIG. 1 illustrates that antenna 101 forms beams 1, 2, 3, 4, 5 and 6, antenna 102 forms beams 7, 8, 9, 10, 11 and 12, antenna 103 forms beams 13, 14, 15, 16, 17 and 18, and antenna 104 forms beams 19, 20, 21, 22, 23 and 24.

In an embodiment of the present disclosure, FIG. 1 illustrates an example in which the terminal 100 has four antennas at four corners, but the number and a location of antennas included in the terminal 100 may be changed according to an alternate design. Further, in an embodiment of the present disclosure, FIG. 1 illustrates an example in which entire beams have different directionality, but some beams may be designed to have the same directionality according to an alternate design. Further, in order to illustrate in the drawing of FIG. 1, a beam direction is illustrated in two-dimensions, but a beam direction actually exists in three-dimensions.

The terminal 100 according to an embodiment of the present disclosure may detect an obstacle 110 located at a periphery thereof, form a transmitting and receiving beam in other directions, except for a direction in which the obstacle 110 is detected, and thus perform beam tracking. In more detail, the terminal 100 may perform beam tracking using other transmitting and receiving beams, except for a transmitting and receiving beam corresponding to a direction in which the obstacle 110 is located among a plurality of transmitting and receiving beams having different directionality. For example, the terminal 100 may detect an obstacle 110 located at a periphery thereof, determine a transmitting and receiving beam (e.g., transmitting and receiving beams 9 to 16) corresponding to a direction in which the obstacle 110 is located among a plurality of transmitting and receiving beams (e.g., transmitting and receiving beams 1 to 24) having different directionality, and perform beam tracking using other beams (e.g., transmitting and receiving beams 1-8 and 17-24), except for the determined transmitting and receiving beam. That is, when the terminal 100 performs beam tracking using transmitting and receiving beams 9-16, which are transmitting and receiving beams corresponding to a direction in which the obstacle 110 is located, it is estimated that beam tracking using a corresponding transmitting and receiving beam represents communication efficiency that is not good due to the detected obstacle 110 and thus the terminal 100 may perform beam tracking using transmitting and receiving beams, except for a corresponding transmitting and receiving beam.

Figure 2:
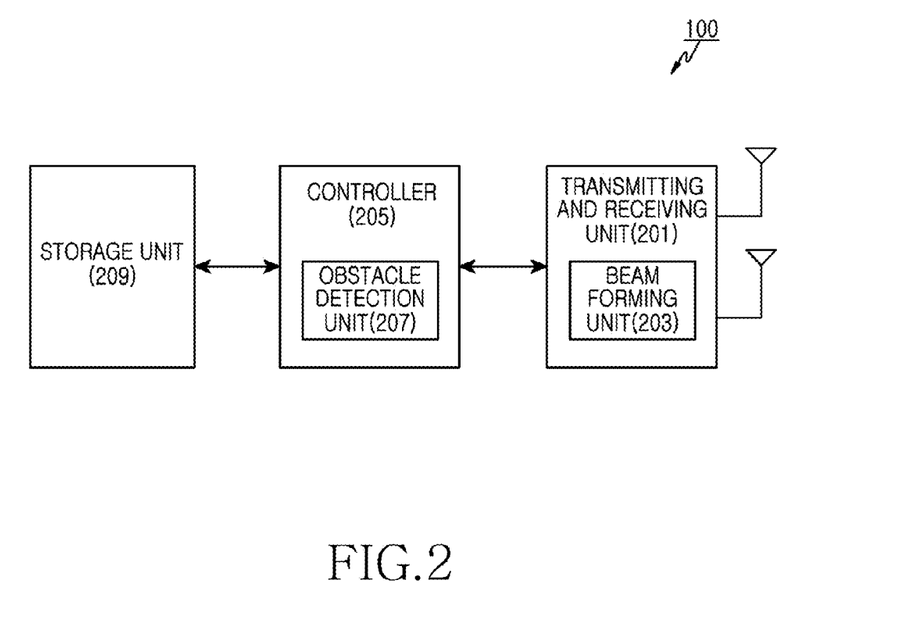
FIG. 2 is a block diagram illustrating a configuration of a terminal according to an embodiment of the present disclosure.

FIG. 2 is a block diagram illustrating a configuration of a terminal according to an embodiment of the present disclosure.

Referring to FIG. 2, a terminal 100 may include a transmitting and receiving unit 201, a controller 205, and a storage unit 209, where any of the units may include a processor and/or a physical memory.

The transmitting and receiving unit 201 controls and performs a function of transmitting and receiving a signal to and from a base station through an antenna beam according to a control of the controller 205. Here, the antenna includes a beam antenna and/or an array antenna that can form a beam in a specific direction. For example, the transmitting and receiving unit 201 may receive a transmitting and receiving signal from the controller 205 and may perform a function of transmitting and receiving a transmitting and receiving signal through a transmitting and receiving beam determined by a beam forming unit 203 included in the transmitting and receiving unit 201. Here, the transmitting and receiving unit 201 is formed in a module, but a transmitting unit and a receiving unit may be separately formed according to a design method, and a transmitting antenna and a receiving antenna may be connected to a transmitting unit and a receiving unit, respectively. The transmitting and receiving unit 201 according to an embodiment of the present disclosure may perform beam tracking using at least one formed transmitting and receiving beam.

The beam forming unit 203 may form a transmitting and receiving beam based on information provided by the controller 205. For example, the beam forming unit 203 may form at least one transmitting and receiving beam to perform beam tracking according to location information and direction information of an obstacle or beamforming vector information representing other directions, except for a direction of an obstacle provided by the controller 205 among a plurality of transmitting and receiving beams having different directionality. The beam forming unit 203 may form a transmitting and receiving beam based on information provided by the controller 205 using at least one of digital beamforming, analog beamforming using a phase shifter, etc., hybrid beamforming in which digital beamforming and analog beamforming is combined, and beamforming physically moving an antenna, antennas corresponding to previously defined each beam direction, antenna bundles, or antenna array.

The controller 205 controls and processes general operations of the terminal 100 for beam tracking. Particularly, the controller 205 may detect an obstacle through an obstacle detection unit 207 included therein, determine a location or a direction in which the detected obstacle exists based on the terminal 100 or a reference beam (e.g., a first transmitting and receiving beam), and control a direction of a transmitting and receiving beam formed in the beam forming unit 203 based on the determined information.

The obstacle detection unit 207 may detect an obstacle located at a periphery of the terminal 100 through at least one sensor (e.g., a proximity sensor, a pressure sensor, a contact sensor (or a touch sensor), a laser sensor, a light detection sensor, or a camera sensor) or a receiving signal (e.g., an electric wave or an ultrasonic wave signal). In other words, the obstacle detection unit 207 may detect that an obstacle, which is located at a periphery of the terminal 100 to disturb signal transmission and reception, exists based on a sensor value input by at least one sensor and determine a transmitting and receiving beam corresponding to a direction in which the obstacle is detected. For example, when an object is detected by a specific proximity sensor of at least one proximity sensor provided in the terminal 100, the obstacle detection unit 207 may detect that the obstacle exists in a direction corresponding to a proximity sensor, having detected an object. For another example, when a contact is detected by a specific contact sensor of at least one contact sensor provided in the terminal 100, the obstacle detection unit 207 may detect that an obstacle exists in a direction corresponding to a contact sensor in which the contact is detected. For another example, when a pressure of a threshold value or more is detected by a specific pressure sensor of at least one pressure sensor provided in the terminal 100, the obstacle detection unit 207 may detect that an obstacle exists in a direction corresponding to a pressure sensor, having detected a pressure of a threshold value or more.

Further, the obstacle detection unit 207 may detect that an obstacle, which is located at a periphery of the terminal 100 to disturb signal transmission and reception, exists based on a signal received by the transmitting and receiving unit 201 and determine a transmitting and receiving beam corresponding to a direction in which the obstacle is detected. For example, the obstacle detection unit 207 may receive a signal from a base station through a plurality of receiving beams having different directionality, and when a signal of a base station received through a specific receiving beam of a plurality of receiving beams is received with an intensity that is stronger than that of a threshold value and weaker than that of a signal of a base station received through other receiving beams, the obstacle detection unit 207 may detect that an obstacle exists in a specific receiving beam direction. For another example, when the obstacle detection unit 207 transmits a signal through some beams of a plurality of beams in which the terminal 100 can form and receives a signal through the remaining beams, and when a signal received through a specific receiving beam is received with the intensity that is stronger than that of a threshold value and that is stronger than that of a signal received through other receiving beams, the obstacle detection unit 207 may detect that an obstacle exists in a direction of a specific receiving beam. In this case, a signal received in the terminal 100 may be a signal transmitted and received by the terminal 100 and refracted and received by an obstacle located at a periphery of the terminal 100. Therefore, the obstacle detection unit 207 may determine a direction in which an obstacle exists based on at least one of a beam direction (or an angle) of a specific receiving beam, a direction (or an angle) of a transmitting beam corresponding to a received signal with a specific receiving beam, a time period from a signal transmitting time point to a receiving time point, and a ratio of reception power to transmission power. Here, a transmitting beam direction corresponding to the received signal may be acquired based on transmitting beam index information included in a receiving signal. For another example, when an ultrasonic wave generator and an ultrasonic wave detection device are provided in the terminal 100, the obstacle detection unit 207 may generate an ultrasonic wave with the ultrasonic wave generator, receive an ultrasonic wave with the ultrasonic wave detection device, and detect that an obstacle exists in a direction in which an ultrasonic wave having an intensity that is stronger than that of a threshold value is detected.

The storage unit 209 may store various data and programs necessary for operation of the terminal 100. When at least one sensor for detecting an obstacle located at a periphery of the terminal 100 is provided in the terminal 100, the storage unit 209 may store information about a correlation between each sensor provided in the terminal 100 and a transmitting and receiving beam. For example, the storage unit 209 may store information representing that a transmitting and receiving beam corresponding to a first proximity sensor is a first transmitting and receiving beam to a fourth transmitting and receiving beam. For another example, when an obstacle is detected by a first proximity sensor, the storage unit 209 may store information representing that a first transmitting and receiving beam to a fourth transmitting and receiving beam are not used upon performing beam tracking. For another example, when an obstacle is detected by a first proximity sensor, the storage unit 209 may store information representing that a fifth transmitting and receiving beam to a tenth transmitting and receiving beam are not used upon performing beam tracking.

Figure 3A:
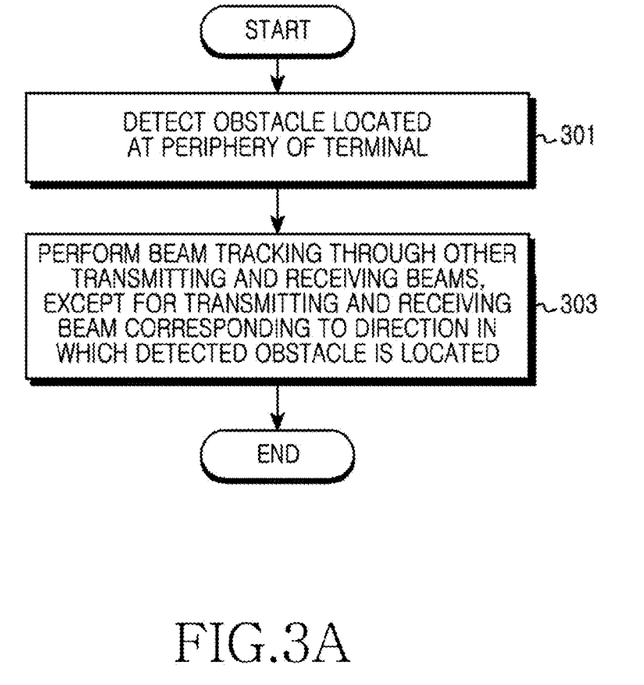
FIG. 3A is a diagram illustrating a procedure in which a terminal performs beam tracking through a transmitting and receiving beam of a direction, except for a direction in which an obstacle is located according to an embodiment of the present disclosure.

FIG. 3A is a diagram illustrating a procedure in which a terminal performs beam tracking through a transmitting and receiving beam of a direction, except for a direction in which an obstacle is located according to an embodiment of the present disclosure.

Referring to FIG. 3A, the terminal 100, as illustrated in FIG. 1 may detect an obstacle located at a periphery thereof at operation 301. For example, the terminal 100 may detect an obstacle located at a periphery thereof using at least one sensor provided in the terminal 100. For another example, the terminal 100 may detect an obstacle located at a periphery thereof based on intensity of a signal received through a transmitting and receiving beam.

Thereafter, the terminal 100 may perform beam tracking through other transmitting and receiving beams, except for a transmitting and receiving beam corresponding to a direction in which the detected obstacle is located at operation 303. In other words, when an obstacle is detected, the terminal 100 may estimate that communication efficiency of a direction in which the obstacle is detected is not good and perform beam tracking in only other directions, except for a direction in which the obstacle is detected.

Figure 3B:
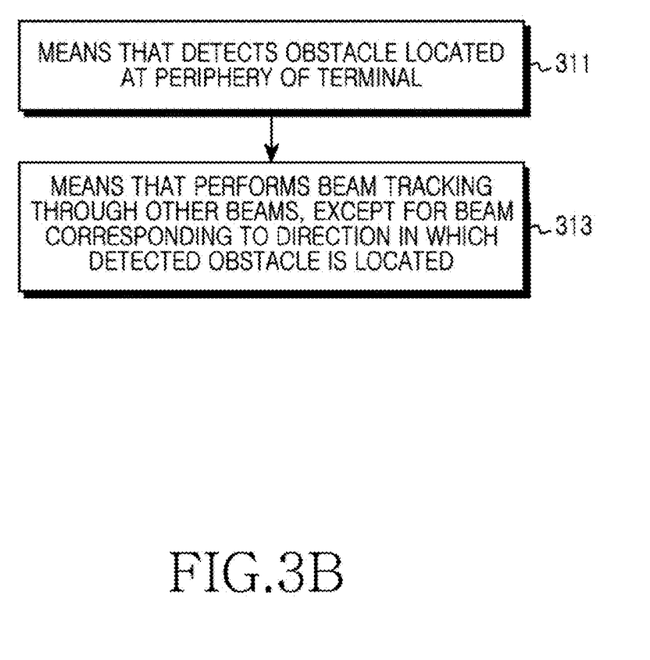
FIG. 3B is a diagram illustrating a means that performs beam tracking through a transmitting and receiving beam of a direction, except for a direction in which an obstacle is located in a terminal according to an embodiment of the present disclosure.

FIG. 3B is a diagram illustrating a means that performs a beam tracking through a transmitting and receiving beam of a direction, except for a direction in which an obstacle is located in a terminal according to an embodiment of the present disclosure.

Referring to FIG. 3B, the terminal 100, as illustrated in FIG. 1 may include a means 311 that detects an obstacle located at a periphery thereof. For example, the terminal 100 may include at least one sensor that detects an obstacle located at a periphery thereof. For example, at least one sensor may include at least one of a proximity sensor, a contact sensor, and a pressure sensor. Furthermore, for example, the terminal 100 may include an ultrasonic wave generator and an ultrasonic wave search device for detecting an obstacle located at a periphery thereof. Moreover, for example, the terminal may include at least one camera.

Further, the terminal 100 may include a means 313 that performs beam tracking through other beams, except for a beam corresponding to a direction in which a detected obstacle is located. When an obstacle is detected, the terminal 100 may include a means that determines a transmitting and receiving beam of a direction in which the obstacle is not detected. For example, when an obstacle is detected, the terminal 100 may include a means that determines a transmitting and receiving beam to perform beam tracking. For another example, when an obstacle is detected, the terminal 100 may include a means that determines a transmitting and receiving beam not to perform beam tracking.

Figure 4:
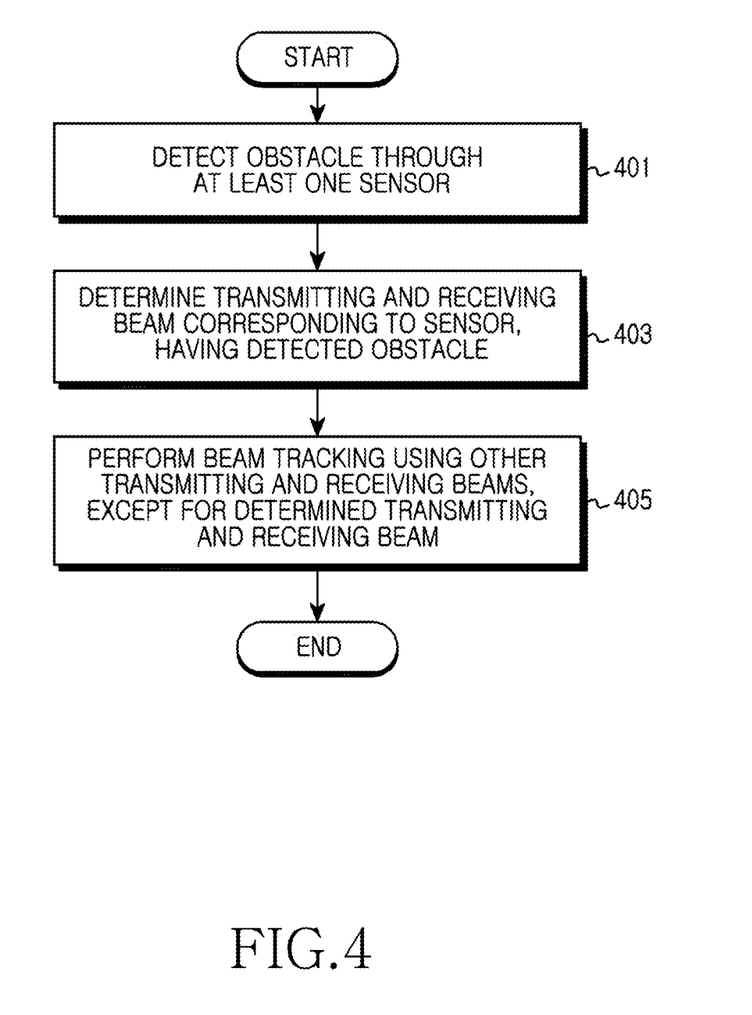
FIG. 4 is a diagram illustrating a procedure in which a terminal detects an obstacle and performs beam tracking through at least one sensor according to an embodiment of the present disclosure.

FIG. 4 is a diagram illustrating a procedure in which a terminal detects an obstacle and performs beam tracking through at least one sensor according to an embodiment of the present disclosure.

Referring to FIG. 4, the terminal 100, as illustrated in FIG. 1, may detect an obstacle through at least one sensor at operation 401. For example, when an object adjacent to a specific proximity sensor of a plurality of proximity sensors provided in the terminal 100 is detected, the terminal 100 may detect that an obstacle exists at a periphery thereof. For another example, when a contact is detected by a specific contact sensor of a plurality of contact sensors provided in the terminal 100, the terminal 100 may detect that an obstacle exists at a periphery thereof. For another example, when a pressure is detected by a specific pressure sensor of a plurality of pressure sensors provided in the terminal 100, the terminal 100 may detect that an obstacle exists at a periphery thereof. For another example, the terminal 100 may generate light using separate light generation devices or flashes of a plurality of cameras attached in other directions and detect an obstacle using brightness information detected through separate light detection sensors or a plurality of camera sensors.

Thereafter, the terminal 100 may determine a transmitting and receiving beam corresponding to a sensor, having detected an obstacle at operation 403. In more detail, when an obstacle is detected by a specific sensor, the terminal 100 may determine a transmitting and receiving beam related to a corresponding sensor.

Figure 7:
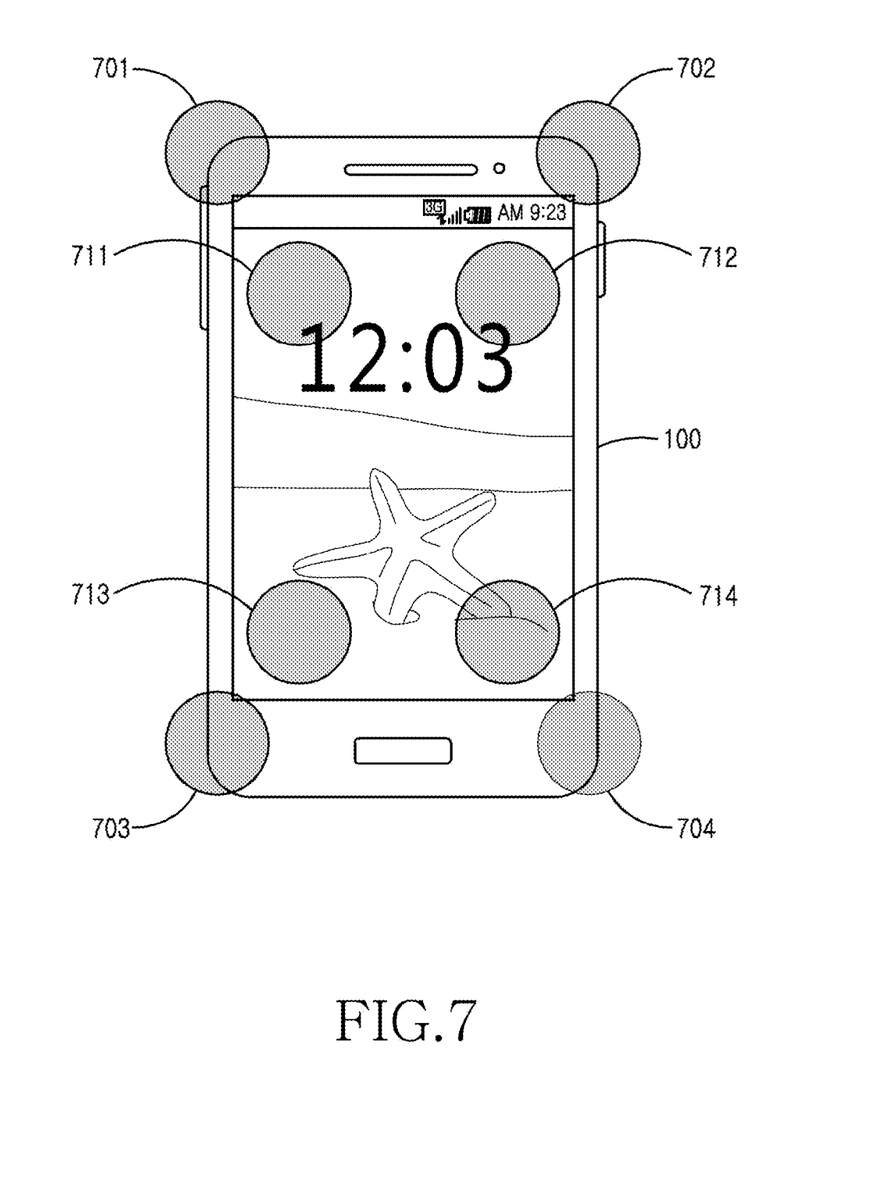
FIG. 7 is a diagram illustrating a location of a transmitting and receiving beam provided in a terminal according to an embodiment of the present disclosure.

This sensor discussed above in operation 403 is illustrated in, for example, FIG. 7. Specifically, FIG. 7 is a diagram illustrating a location of a transmitting and receiving beam provided in a terminal according to an embodiment of the present disclosure.

Referring to FIG. 7, it is assumed that four antennas 701, 702, 703 and 704, which form a plurality of transmitting and receiving beams, are provided in different directions at four corners of the terminal 100, and it is assumed that a first antenna 701 forms a first transmitting and receiving beam to a sixth transmitting and receiving beam, a second antenna 702 forms a seventh transmitting and receiving beam to a twelfth transmitting and receiving beam, a third antenna 703 forms a thirteenth transmitting and receiving beam to an eighteenth transmitting and receiving beam, and a fourth antenna 704 forms a nineteenth transmitting and receiving beam to a twenty-fourth transmitting and receiving beam. Further, referring to FIG. 7, it is assumed that sensors 711, 712, 713 and 714 are provided at different four locations, respectively, of the terminal 100.

For example, when an obstacle is detected by a second proximity sensor 712 of proximity sensors 711 to 714 provided in the terminal 100, the terminal 100 may determine a seventh transmitting and receiving beam to a twelfth transmitting and receiving beam related to the second proximity sensor 712. For example, a transmitting and receiving beam related to the second proximity sensor 712 may be a transmitting and receiving beam located at a distance most adjacent to the second proximity sensor 712. Further, a correlation between the sensor and the transmitting and receiving beam may be previously set and stored at a design operation or may be changed and stored according to user setting.

Turning back to FIG. 4, the terminal 100 may perform beam tracking using other transmitting and receiving beams, except for the determined transmitting and receiving beam at operation 405. For example, the terminal 100 may perform beam tracking using a first transmitting and receiving beam to a sixth transmitting and receiving beam and a thirteenth transmitting and receiving beam to a twenty-fourth transmitting and receiving beam, except for the determined seventh transmitting and receiving beam to twelfth transmitting and receiving beam.

Thereafter, the terminal 100 may terminate a procedure according to an embodiment of the present disclosure.

Here, it is assumed that a plurality of sensors of the terminal 100 are provided at different locations. However, according to an embodiment of the present disclosure, even when one sensor is provided in the entire of a front surface portion or the entire of a rear surface portion of the terminal 100, the terminal 100 may detect an obstacle by one sensor and perform beam tracking in a transmitting and receiving beam direction, except for a direction in which the obstacle is detected. For example, when a touch sensor is provided in the entire of a front surface portion of the terminal 100, the terminal 100 may determine a direction in which an obstacle is located based on a location (e.g., a touch coordinate) in which a touch is detected by the touch sensor and perform beam tracking in a transmitting and receiving beam direction, except for a direction in which the obstacle is located. For example, the terminal 100 should divide the touch sensor into a plurality of areas and store transmitting and receiving beam index information or direction information related to the divided each area.

Figure 5:
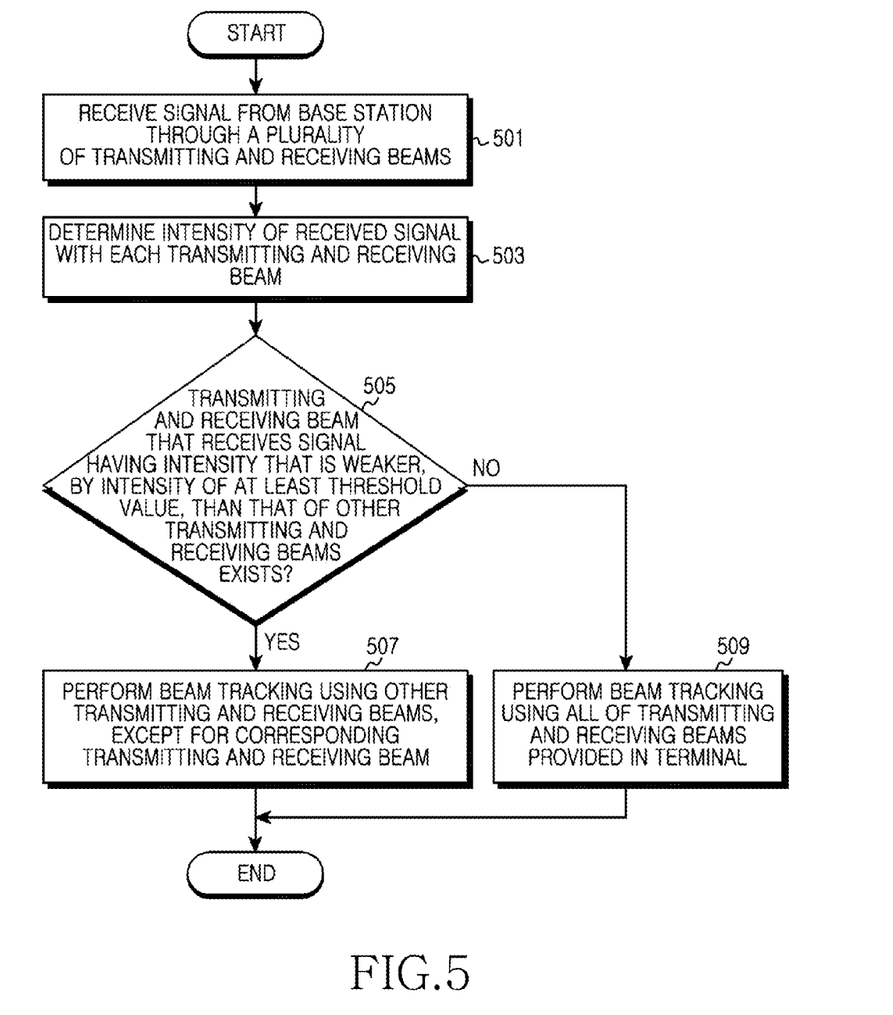
FIG. 5 is a diagram illustrating a procedure in which a terminal detects an obstacle and performs beam tracking through an intensity of a received signal according to an embodiment of the present disclosure.

FIG. 5 is a diagram illustrating a procedure in which a terminal detects an obstacle and performs beam tracking through an intensity of a received signal according to an embodiment of the present disclosure.

Referring to FIG. 5, the terminal 100 may receive a signal from a base station through a plurality of transmitting and receiving beams at operation 501.

Figure 8:
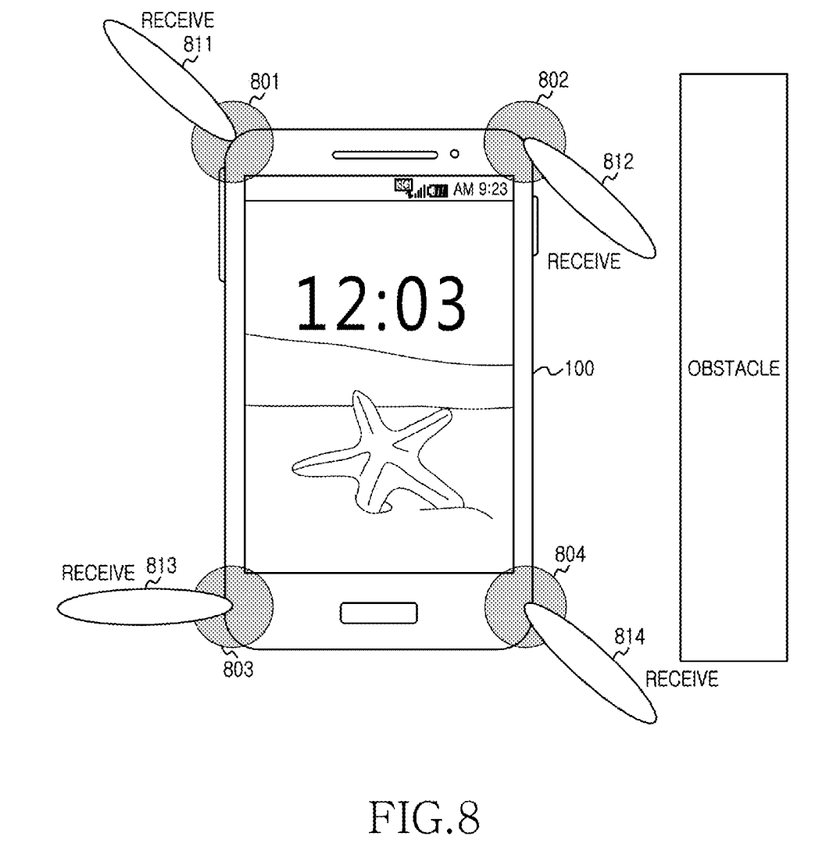
FIG. 8 is a diagram illustrating an example in which a terminal detects an obstacle and performs beam tracking through an intensity of a signal received from a base station according to an embodiment of the present disclosure.

This signal received in operation 501 may be received through various antennas as, for example, illustrated in FIG. 8. Specifically, FIG. 8 is a diagram illustrating an example in which a terminal detects an obstacle and performs beam tracking through an intensity of a signal received from a base station according to an embodiment of the present disclosure.

Referring to FIG. 8, a terminal 100 is illustrated, where the terminal 100 includes four antennas 801, 802, 803 and 804 at respective corners thereof.

For example, referring to FIG. 8, the terminal 100 receives a signal by simultaneously forming four beams through the four antenna 801 to 804 and may receive sequentially or simultaneously a signal from the base station through an entire beam direction that can be formed in the terminal 100 while changing a beam direction of each of four antennas 801 to 804.

Thereafter, the terminal 100 may determine an intensity of a received signal with each transmitting and receiving beam at operation 503. For example, the terminal 100 may determine intensity of a signal received through beams formed in different directions in each of four antennas 801 and 804.

Thereafter, the terminal 100 may determine whether a transmitting and receiving beam that receives a signal having an intensity that is weaker, by an intensity of at least a threshold value, than that of other transmitting and receiving beams exists at operation 505.

If the transmitting and receiving beam that receives a signal having the intensity that is weaker, by the intensity of at least the threshold value, than that of the other transmitting and receiving beams exists (i.e., yes at operation 505), then the terminal 100 may perform beam tracking using other transmitting and receiving beams, except for a corresponding transmitting and receiving beam at operation 507. In more detail, the terminal 100 may form a beam in other beam directions through four antennas 801 to 804 provided in the terminal 100 and receive a signal from the base station. For example and referring to FIG. 8, the intensity of a signal received through a beam 812 formed in a second antenna 802 may have an intensity that is remarkably weaker than that of a signal received through beams 811, 813, and 814 formed in other antennas 801, 803 and 804 because of an obstacle located at a periphery. For example, the terminal 100 may perform beam tracking using the remaining directions, except for a direction of the beam 812 formed in the second antenna 802. Accordingly, the terminal 100 may exclude only the beam 812 having signal intensity that is remarkably weaker than that of other beams from a beam tracking target or may exclude beam 812 and a predetermined number of transmitting and receiving beams adjacent to beam 812 from a beam tracking target.

If the transmitting and receiving beam that receives a signal having the intensity that is weaker, by the intensity of at least the threshold value than that of the other transmitting and receiving beams does not exist (i.e., no at operation 505), then the terminal 100 may perform beam tracking using all of the transmitting and receiving beams which are provided in the terminal 100 at operation 509.

Thereafter, the terminal 100 may terminate a procedure according to an embodiment of the present disclosure.

Figure 6:
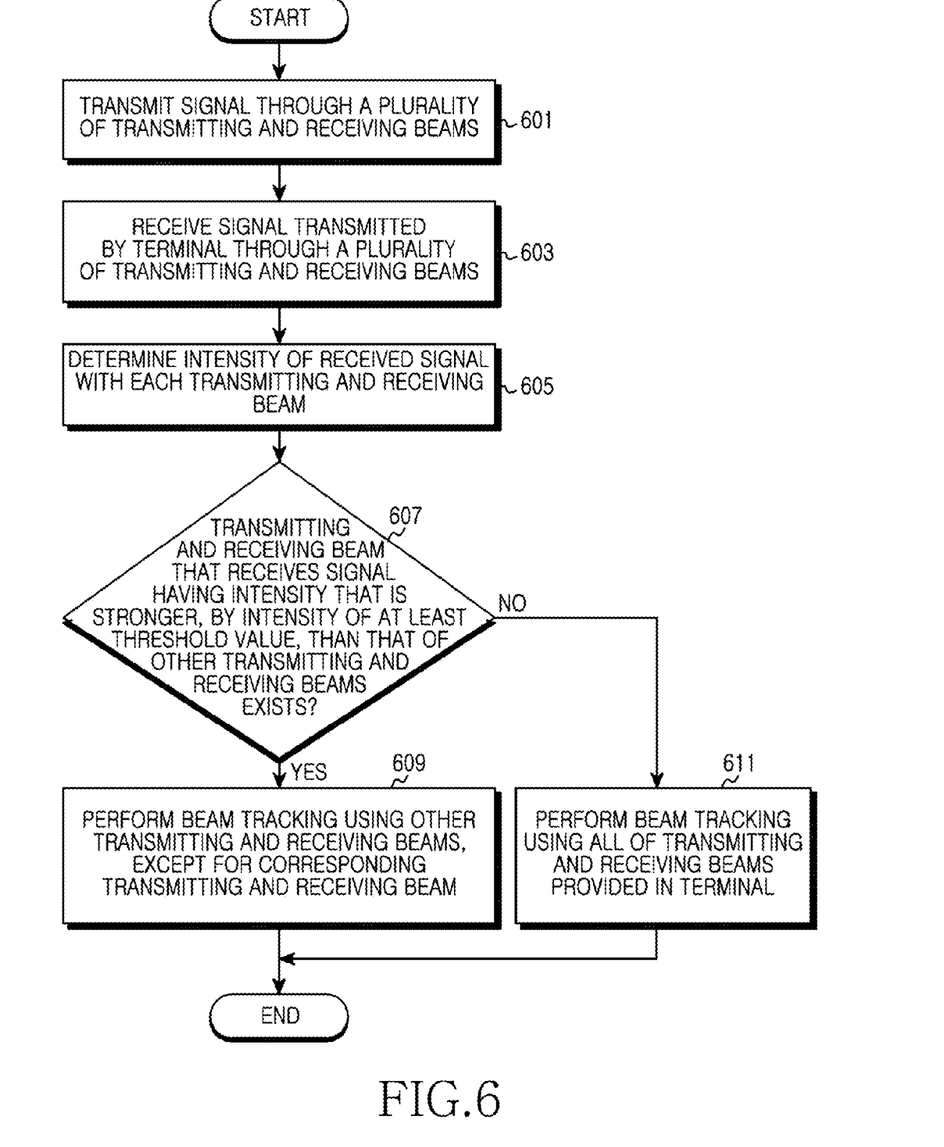
FIG. 6 is a diagram illustrating a procedure in which a terminal detects an obstacle and performs beam tracking through an intensity of a received signal according to an embodiment of the present disclosure.

FIG. 6 is a diagram illustrating a procedure in which a terminal detects an obstacle and performs beam tracking through an intensity of a received signal according to an embodiment of the present disclosure.

Referring to FIG. 6, a terminal 100, as illustrated in FIG. 1 may transmit a signal through a plurality of transmitting and receiving beams at operation 601. For example, when a beam tracking event occurs, in order to determine a direction of a beam to perform beam tracking, the terminal 100 may transmit a signal through a plurality of transmitting and receiving beams.

Figure 9:
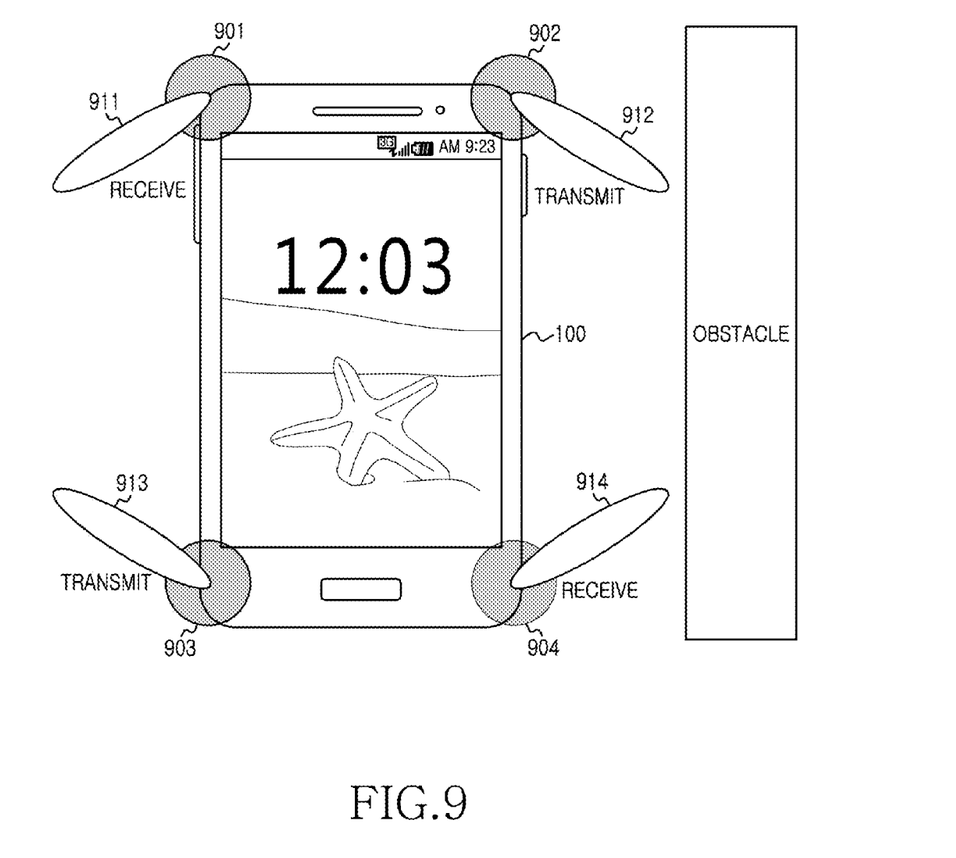
FIG. 9 is a diagram illustrating an example in which a terminal detects an obstacle and performs beam tracking through an intensity of a signal received from a base station according to an embodiment of the present disclosure.

This signal that is transmitted in operation 601 may be transmitted through various antennas as, for example, illustrated in FIG. 9. Specifically, FIG. 9 is a diagram illustrating an example in which a terminal detects an obstacle and performs beam tracking through an intensity of a signal received from a base station according to an embodiment of the present disclosure.

Referring to FIG. 9, a terminal 100 is illustrated, where the terminal 100 includes four antennas 901, 902, 903 and 904 at respective corners thereof and where a first antenna 901 forms a receive beam 911, a second antenna 902 forms a transmit beam 912, a third antenna 904 forms a transmit beam 913 and a fourth antenna 904 forms a receive beam 914.

For example, the terminal 100 may transmit a signal while changing a direction of a beam using two antennas 902 and 903 of the four antennas 901 to 904.

The terminal 100 may receive a signal transmitted by the terminal 100 through a plurality of transmitting and receiving beams at operation 603. In other words, in order to determine a direction of a beam to perform beam tracking, the terminal 100 may receive a signal transmitted through other transmitting and receiving beams. For example, the terminal 100 may receive a signal while changing a direction of a beam using the remaining two antennas 901 and 904 that are not used for signal transmission among four antennas 901 to 904.

Thereafter, the terminal 100 may determine an intensity of a received signal with each transmitting and receiving beam at operation 605. For example, the terminal 100 may determine intensity of a signal received through beams formed in other directions in each of two antennas 901 and 904. For example, the signal received by the terminal 100 may be a signal transmitted through two antennas 902 and 903 of the terminal 100 and refracted and received by an obstacle located at a periphery of the terminal 100.

Thereafter, the terminal 100 may determine whether a transmitting and receiving beam that receives a signal having intensity that is stronger, by an intensity of at least a threshold value, than that of other transmitting and receiving beams exists at operation 607.

If the transmitting and receiving beam that receives a signal having the intensity that is stronger, by the intensity of at least the threshold value, than that of the other transmitting and receiving beams exists (i.e., yes at operation 607), then the terminal 100 may perform beam tracking using other transmitting and receiving beams, except for a corresponding transmitting and receiving beam at operation 609.

For example and referring to FIG. 9, the terminal 100 may form a beam in different beam directions through two antennas 901 and 904 provided in the terminal 100 and receive a signal, and the intensity of a signal received through a beam 914 of a specific direction formed in a fourth antenna 904 may be remarkably stronger than that of a signal refracted by an obstacle located at a periphery and received through beam 911 formed in antenna 901. As such, the terminal 100 may perform beam tracking using the remaining directions, except for a direction of the specific beam 914 formed in the fourth antenna 904. For example, the terminal 100 may exclude only beam 914 having the signal intensity that is remarkably weaker than that of other beams from a beam tracking target or may exclude beam 914 and the predetermined number of transmitting and receiving beams adjacent to beam 914 from a beam tracking target.

Further, the terminal 100 may determine a direction in which an obstacle exists using at least one of a beam direction (or an angle) of the specific beam 914 of the fourth antenna 904, a direction (or an angle) of a transmitting beam, having transmitted a signal received through the specific beam 914, a time period from a transmitting time point to a receiving time point of a corresponding signal, and a ratio of reception power to transmission power of a corresponding signal. For example, the terminal 100 may perform beam tracking using the remaining directions (e.g., beam 911 formed in the first antenna 901 and the beam 913 formed in the third antenna 903), except for a direction of the specific beam 914 formed in the fourth antenna 904 and/or a direction of a specific beam 912 formed in the second antenna 902.

If the transmitting and receiving beam that receives a signal having the intensity that is stronger, by the intensity of at least the threshold value, than that of the other transmitting and receiving beams does not exist (i.e., no at operation 607), then the terminal 100 may perform beam tracking using all transmitting and receiving beams provided in the terminal 100 at operation 611.

Thereafter, the terminal 100 may terminate a procedure according to an embodiment of the present disclosure.

An embodiment of the present disclosure and entire function operations described in this specification may be executed with computer software, firmware, or hardware, or at least one combination thereof including a structure disclosed in this specification and equivalent structures thereof. Further, various embodiments of the present disclosure described in this specification may be executed by at least one computer program product, i.e., a data processing device or may be executed with at least one module of computer program commands encoded on a non-transitory computer readable medium for controlling operation of the device.

The non-transitory computer readable medium may be a configuration of a material or at least one combination thereof that has an influence on a machine readable storage medium, a machine readable storage substrate, a memory device, and a machine readable radio wave stream. A term of a data processing device includes, for example, an entire node, device, and machine for processing data including a programmable processor, a computer, or a multiple processor or computer. The device may include a code, for example, a code that configures processor firmware, a protocol stack, a database management system, an operation system, or at least one combination thereof that generates an execution environment of a corresponding computer program by adding to hardware.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a terminal, the method comprising:
   detecting an object around the terminal; and
   performing beam operation associated with beam tracking through remaining beams among a plurality of beams, except for a beam that is formed for a direction from the terminal to the detected object.

2. The method of claim 1, wherein the object is detected by at least one sensor provided in the terminal.

3. The method of claim 2, wherein the at least one sensor comprises at least one of a proximity sensor, a pressure sensor, a contact sensor, a touch sensor, a laser sensor, a light detection sensor and a camera sensor.

4. The method of claim 1, wherein the detecting of the object comprises:
   detecting an existence of the object based on data input by at least one sensor provided in the terminal; and
   determining a beam direction related to a sensor, which detected the existence of the object, as the direction in which the detected object is located.

5. The method of claim 1, wherein the object is detected through a signal received in the terminal.

6. The method of claim 5, wherein the received signal comprises at least one of an electric wave signal and an ultrasonic wave signal.

7. The method of claim 1, wherein the detecting of the object comprises:
   receiving a signal from a base station through the plurality of beams;
   determining an intensity of the signal received through each of the plurality of beams; and
   determining a direction in which the object is located based on the determined signal intensity.

8. The method of claim 1, wherein the detecting of the object comprises:
   transmitting a signal through at least one beam of the plurality of beams;
   receiving a signal transmitted through remaining beams of the plurality of beams, except for the at least one beam having transmitted the signal, from among the plurality of beams;
   determining an intensity of the signal received through each of the remaining beams; and
   determining the direction in which the object is located based on the determined signal intensity.

9. The method of claim 8, wherein the determining of the direction comprises:
   selecting a receiving beam of the remaining beams based on the determined signal intensity; and
   determining the direction in which the object is located based on at least one of a direction of the selected receiving beam, a transmitting beam direction of a signal received through the selected receiving beam, a time period from a transmitting time point to a receiving time point of the received signal, and a ratio of reception power to transmission power of the received signal.

10. The method of claim 1, wherein the performing the beam operation associated with the beam tracking comprises:
    determining at least one beam corresponding to the direction from the terminal to the detected object among the plurality of beams; and
    performing the beam operation associated with the beam tracking through remaining beams, except for the at least one beam among the plurality of beams.

11. The method of claim 1, wherein the performing the beam operation associated with the beam tracking comprises performing the beam operation associated with the beam tracking according to one or more of a preset number or a preset time.

12. A device of a terminal, the device comprising:
- an object detection unit configured to detect an object around the device; and
- a beam forming unit configured to perform beam operation associated with beam tracking through remaining beams among a plurality of beams, except for a beam that is formed for a direction from the device to the detected object.

13. The device of claim 12, further comprising at least one sensor, wherein the object detection unit is further configured to detect the object by the at least one sensor of the device.

14. The device of claim 13, wherein the at least one sensor comprises at least one of a proximity sensor, a pressure sensor, a contact sensor, a touch sensor, a laser sensor, a light detection sensor and a camera sensor.

15. The device of claim 12, wherein the object detection unit is further configured to detect an existence of the object based on data input by at least one sensor provided in the device and to determine a beam direction related to a sensor, which detected the existence of the object, as the direction in which the detected object is located.

16. The device of claim 12, wherein the object detection unit is further configured to detect the object through a signal received in the device.

17. The device of claim 16, wherein the received signal comprises at least one of an electric wave signal and an ultrasonic wave signal.

18. The device of claim 12, wherein the object detection unit is further configured to receive a signal from a base station through the plurality of beams, to determine an intensity of the signal received through each of the plurality of beams, and to determine a direction in which the object is located based on the determined signal intensity.

19. The device of claim 12, wherein the object detection unit is further configured to transmit a signal through at least one beam of the plurality of beams, to receive a signal transmitted through remaining beams of the plurality of beams, except for the at least one beam having transmitted the signal, from among the plurality of beams, to determine an intensity of the signal received through each of the remaining beams, and to determine the direction in which the object is located based on the determined signal intensity.

20. The device of claim 19, wherein the object detection unit is further configured to select a receiving beam of the remaining beams based on the determined signal intensity and to determine the direction in which the object is located based on at least one of a direction of the selected receiving beam, a transmitting beam direction of a signal received through the selected receiving beam, a time period from a transmitting time point to a receiving time point of the received signal, and a ratio of reception power to transmission power of the received signal.

21. The device of claim 12, wherein the beam forming unit is further configured to determine at least one beam corresponding to the direction from the device to the detected object among a the plurality of beams, and to perform the beam operation associated with the beam tracking through remaining beams, except for the at least one beam among the plurality of beams.

22. The device of claim 12, wherein the beam forming unit is further configured to perform the beam operation associated with the beam tracking according to one or more of a preset number or a preset time through other beams, except for the beam that is formed for a direction from the device to the detected object.

23. The device of claim 12, wherein the object detection unit is further configured to determine whether a beam, which receives a signal having an intensity that is weaker, by an intensity of at least a threshold value, than other beams exists, and
- wherein the beam forming unit is further configured to, when the object detection unit determines that the beam exists, perform beam operation associated with the beam tracking using other beams, except for the beam determined by the object detection unit to exist, and when the object detection unit determines that the beam does not exist, perform the beam operation associated with the beam tracking using all of the beams formed by the device.

* * * * *